F. MITCHELL-COLSON.
COOKING UTENSIL.
APPLICATION FILED FEB. 4, 1914.
1,133,168.
Patented Mar. 23, 1915.
2 SHEETS—SHEET 1.
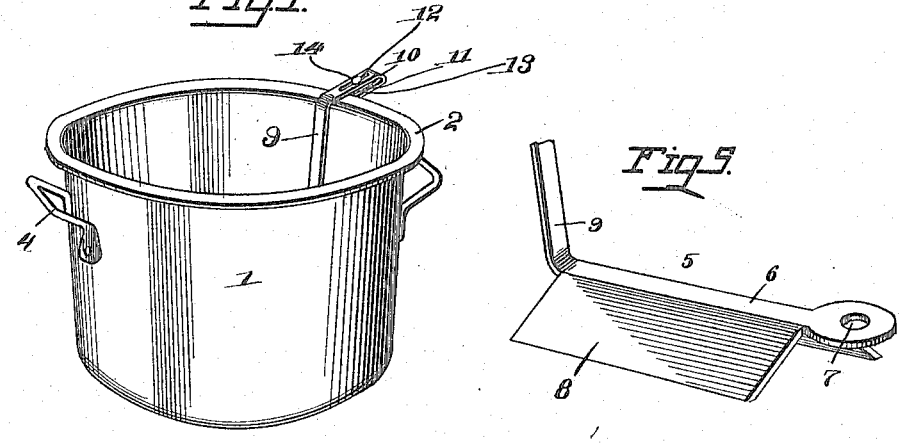
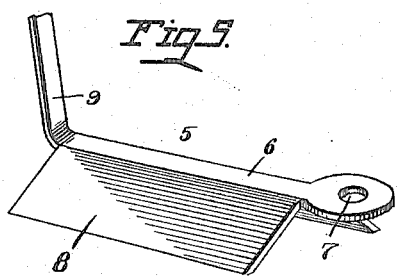
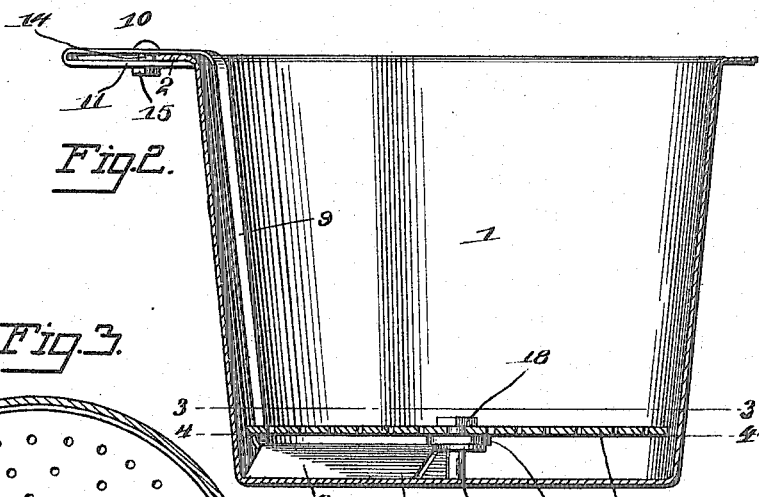
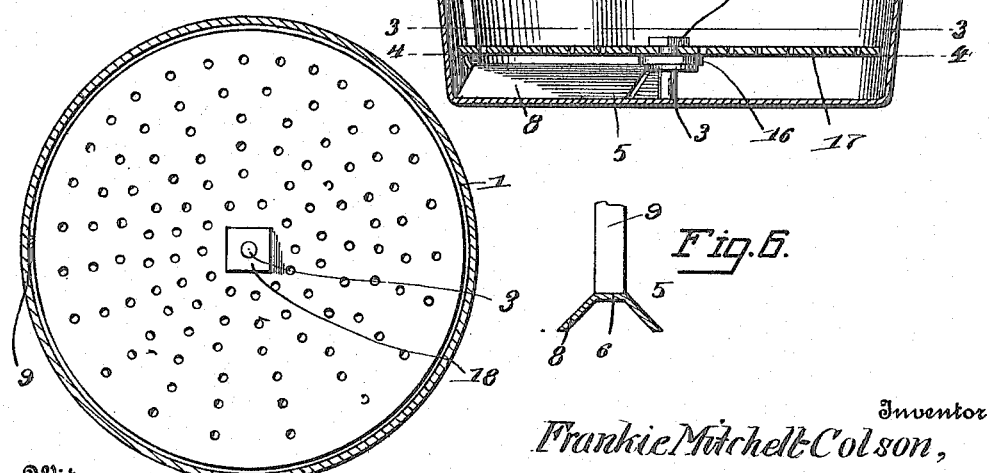
Inventor
Frankie Mitchell-Colson,
Witnesses
Frederic W. Ely
By Victor J. Evans
Attorney F. MITCHELL-COLSON.
COOKING UTENSIL.
APPLICATION FILED FEB. 4, 1914.
1,133,168.
Patented Mar. 23, 1915.
2 SHEETS—SHEET 2.
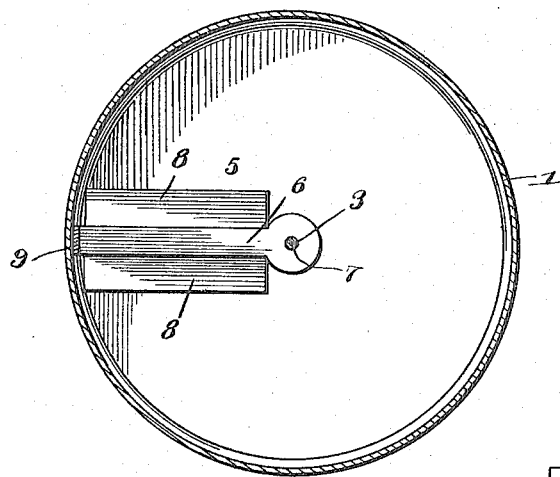
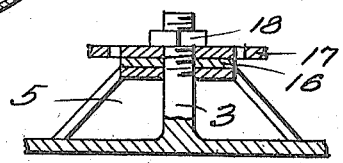
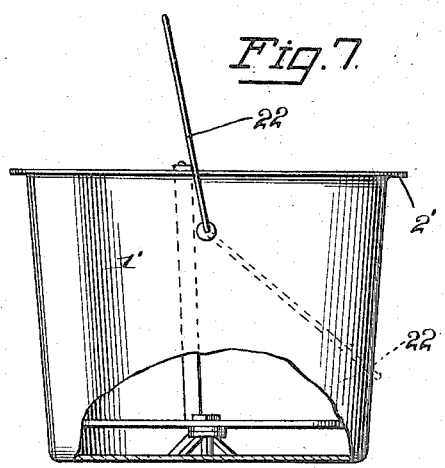
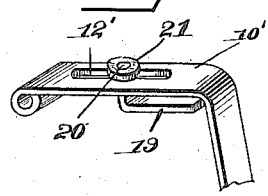
Witnesses
Frederic W. Ely.
Inventor
Frankie Mitchell-Colson,
By Victor J. Evans
Attorney

UNITED STATES PATENT OFFICE.

FRANKIE MITCHELL-COLSON, OF SAN BERNARDINO, CALIFORNIA.

COOKING UTENSIL.

1,133,168. Specification of Letters Patent. Patented Mar. 23, 1915.

Application filed February 4, 1914. Serial No. 816,400.

*To all whom it may concern:*

Be it known that I, FRANKIE MITCHELL-COLSON, a citizen of the United States, residing at San Bernardino, in the county of San Bernardino and State of California, have invented new and useful Improvements in Cooking Utensils, of which the following is a specification.

The present invention relates to improvements in cooking utensils.

In carrying out my invention I propose to construct or otherwise provide a cooking utensil with means whereby the article or material within the utensil will be protected against burning, and furthermore, to provide means whereby the substance being cooked will be prevented from adhering to the utensil.

With the above and other objects in view, the invention consists in the construction, combination and arrangement of parts set forth in the following specification and falling within the scope of the appended claims.

In the drawings: Figure 1 is a perspective view of a cooking utensil constructed in accordance with the present invention, Fig. 2 is a central vertical longitudinal sectional view through the same, Fig. 3 is a horizontal section on the line 3—3 of Fig. 2, Fig. 4 is a similar section on the line 4—4 of Fig. 2, Fig. 5 is a perspective view of the scraper, Fig. 6 is a transverse sectional view taken approximately centrally through the scraper, Fig. 7 is a view, partly in section, of a slight modification, Fig. 8 is a detail perspective view of the upper portion or handle of the scraper illustrated in Fig. 7, Fig. 9 is a detail view of the threaded stud.

Referring now to the drawings in detail, the numeral 1 designates a cooking utensil in the nature of a sauce pan or pot, the same having its mouth formed with a continuous circumferential flange or bead 2. The utensil 1 has its bottom centrally provided with an upstanding threaded stud 3, the purpose of which will presently be described, and the utensil is preferably provided below its flange 2 with substantially U-shaped bails or handles 4, one being arranged diametrically opposite the other.

The numeral 5 designates the scraper member for the utensil. This scraper is of a peculiar construction and includes a horizontally straight portion 6 which has its end enlarged to provide an eye 7 which is adapted to be passed over the stud 3. Formed upon the sides of the horizontal member 6 and extending downwardly therefrom in opposite angular directions are substantially rectangular wings 8, the said wings being constructed of some resilient or flexible material. The web or connecting member 6 for the wings 8 is provided with a vertical extension or strap 9, which is also of resilient material and which is adapted to frictionally contact with the inner surface of the vessel 1, the said strap being bent outwardly over the flange 2 to provide a horizontally disposed handle 10. The handle 10 has its end bent to provide a lower member 11, the said member being disposed directly below the upper portion 10 of the handle proper, and the said portion 11 is adapted to engage with the outer surface of the utensil just below the flange. The member 11 being also constructed of resilient material is adapted to exert a tension or pressure toward the portion 10 of the handle, and to tightly contact with the underface of the flange. In order to assist the member 11 in such contact, both the members 10 and 11 may be provided with registering longitudinally extending slots 12 and 13 respectively through which is passed a bolt 14 having a nut 15. By such an arrangement it will be noted that not only is the member 11 brought into proper contact with the flange 2 of the utensil, but the end of said member engaging with the outer surface of the utensil will cause the strap 9 to lie tightly against the inner surface of the utensil, and as a consequence, the said member 9 serves as a scraping element for the sides of the utensil, the wings 8 serving as the scraper members for the bottom of the utensil, and the handle 10 providing means whereby the scraper may be revolved upon the stud 9, entirely around the utensil if desired. Arranged upon the stud 3 over the eye 7 is a washer 16.

The numeral 17 designates a foraminous disk which has a central opening to receive the upper and threaded end of the stud 3 to permit the disk 17 to rest upon the washer 16.

The numeral 18 designates a nut screwed upon the stud and which serves as a means for retaining the disk 17 within the vessel. The nut 18 may be regulated upon the stud to force the disk 17 downward in the vessel, causing the washer 16 to forcibly contact with the enlarged end of the portion 6 provided with the eye 7, to spread the wings 8 of the scraper to force the edges of the same tightly against the bottom of the vessel. The adjusting of the nut 18 will, of course, permit of the angular wings 8 contracting or expanding toward each other, to raise the central portion or web 6 thereof, and as a consequence elevate the disk 17.

In Figs. 7 and 8 I have illustrated a slightly modified form of my improvement. In these figures the utensil 1' is provided with a continuous flange 2' and has the scraper and disk arranged therein in a similar manner to that previously described. The handle 10' of the scraper is not, however, provided with the inturned member 11, but in lieu thereof I provide a longitudinally adjustable member 19, the same having one of its ends formed with an angular threaded member or stud 20 which passes through the elongated opening 12' in the handle 10' and which receives the binding nut 21. By this arrangement the member 19 may be adjusted to engage with the outer surface of utensils, regardless of the width of the flanges thereof, and the said member 19 may be also, through the medium of the nut 21, brought into tight frictional engagement with the underface of the flange.

In Fig. 7, instead of the permanently secured handles 4 I have illustrated the vessel as provided with a swinging bail 22, and it will be noted that the handle 10 will serve as a support for the bail to hold the same from contact with the sides of the vessel, and as a consequence retain the bail in a comparatively cool condition, so that the same may be handled without burning the hand of the operator. When the scraper is to be revolved entirely around the vessel the bail may be thrown to the position shown in the dotted lines against the side of the vessel or utensil 2', and out of the path of contact of the handle 10' of the scraper.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

1. A vessel having a flanged mouth and its bottom provided with a centrally disposed threaded upstanding stud, a scraper, said scraper including a horizontally disposed web having its end formed with an eye which is arranged upon the stud, the longitudinal edges of the web having integrally formed angularly disposed resilient scraper wings which contact with the bottom of the vessel, a washer upon the stud supported by the eye of the scraper, a foraminous disk upon the stud and resting upon the washer, a nut engaging the stud and contacting with the disk, the web of the scraper having an angular scraper strap extension which contacts the inner wall of the utensil, said strap having its end bent over the flange to provide a handle for the scraper and a slidable vertically disposed adjustable member arranged upon the handle to contact with the underface of the flange and with the outer face of the vessel.

2. The combination of a vessel having its bottom provided with a centrally projecting threaded stud, of a scraper including a web having an extension provided with an opening to receive the stud, the said scraper having angular substantially rectangular wings extending from its longitudinal edges and contacting the bottom of the vessel, a nut upon the stud adapted to retain the scraper upon the stud and to adjust the contact of the wings with the bottom of the vessel.

3. In combination, a vessel having a scraper member therein, said scraper including angularly disposed resilient wings, means for retaining the scraper within the vessel, said means including an adjustable member whereby the wings may be spread or permitted to contract in a direction toward each other and to be retained in either of such positions.

4. In a device of the class set forth, the combination with a vessel having a central stud upon its bottom, a scraper, a horizontally disposed web having an opening adjacent one of its ends to receive the stud, the said web having its edges formed with angular depending sides providing wings, a washer upon the stud over the web of the scraper, a disk upon the stud over the washer, and an adjustable element connected with the stud and contacting with the disk.

5. The combination, a vessel having its bottom provided with a centrally arranged stud and a flanged edge, a scraper member within the vessel and mounted for rotary movement upon the stud, said scraper including oppositely disposed angular flanges which have their edges contacting with the bottom, means arranged upon the stud for adjusting the contacting engagement of the said edges with the bottom, an angular member formed with the scraper and contacting with the inner wall of the vessel, said member having its end arranged angularly over the flange of the vessel to provide an operating handle, and longitudinally adjustable means carried by said handle engaging with the flange at the mouth of the vessel.

In testimony whereof I affix my signature in presence of two witnesses.

FRANKIE MITCHELL-COLSON.

Witnesses:
F. M. CURTIN,
OLGA S. CASEY.